Jan. 11, 1949.　　　　B. N. WALLIS　　　　2,459,009
AIRCRAFT BODY AND WING ARRANGEMENT

Filed May 25, 1946　　　　　　　　　　　4 Sheets-Sheet 1

Inventor
Barnes Neville Wallis
By Morss, Nolte, Crews & Berry
attys.

Jan. 11, 1949.   B. N. WALLIS   2,459,009
AIRCRAFT BODY AND WING ARRANGEMENT
Filed May 25, 1946   4 Sheets-Sheet 2

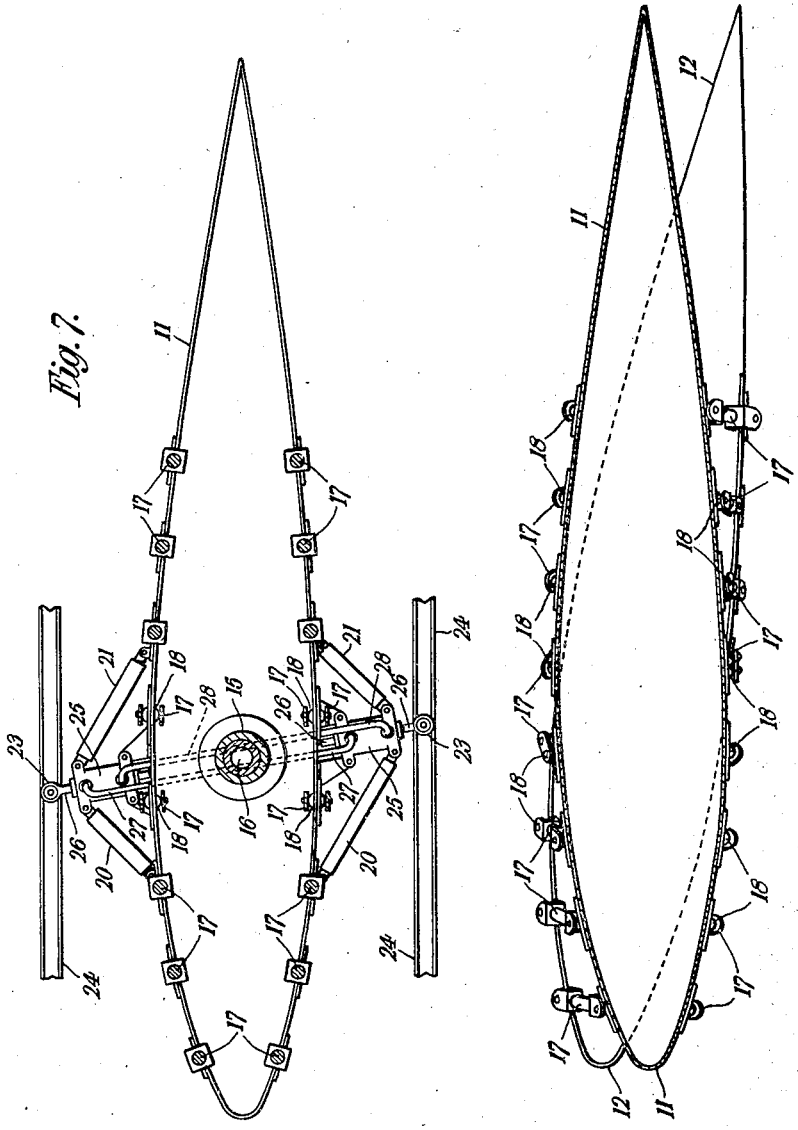

UNITED STATES PATENT OFFICE 2,459,009

AIRCRAFT BODY AND WING ARRANGEMENT

Barnes Neville Wallis, Weybridge, England, assignor to Vickers-Armstrongs Limited, London, England Application May 25, 1946, Serial No. 672,249
In Great Britain March 1, 1945

Section 1, Public Law 690, August 8, 1946
Patent expires March 1, 1965

10 Claims. (Cl. 244—13)

The two outstanding problems of dynamic flight are the attainment of a satisfactory degree of (a) stability and (b) control of the flying body.

In aeroplanes of the conventional fixed-wing type stability in pitch and yaw is obtained by means of surfaces, projecting into the airstream in both horizontal and vertical planes, and supported at a convenient distance from the centre of gravity in such position that; if the steady horizontal rectilinear flight be disturbed, the forces acting on the stabilising surfaces will automatically restore the aeroplane to its original condition. In the case of aeroplanes comprising wings and fuselage, the latter is extended for some distance, usually rearwards, to form a cantilever structure on which the horizontal and vertical surfaces are mounted. In the case of aeroplanes comprising wings only, the wings are usually extended rearwards or forwards in a Λ plan formation stability in pitch being then achieved by a combination of plan form and wash-out or wash-in, the yaw-stabilising surfaces being mounted at the wing tips.

The requisite degree of stability having been obtained, control of flight is provided in the conventional aeroplane by deflecting certain parts of the stabilising surfaces in such fashion as to set up forces by which changes in pitch, roll or yaw can be made as desired from time to time in the flight of the areoplane. In this specification, "control" is used to mean the ability to produce such changes in pitch, roll or yaw, as the case may be. After prolonged experience of various mechanical devices, the method of control hitherto generally accepted is the use of ailerons for roll, elevators for pitch and rudders for yaw.

It is inevitable that the presence of the stabilising and control surfaces, together with the structure required to carry them, should increase the weight and drag of an aeroplane substantially, and an analysis of existing types of aircraft shows that approximately 3% of the all-up weight and from 15 to 20% of the parasite drag are attributable to the stabilising and control surfaces or their equivalent and to the structure of which the sole function is to support them. The problem of drag is likely to become even more serious in aeroplanes of conventional form due to the large increase in fin and rudder areas which will be required with increasing size of aeroplane and the multiplication of power-units to meet the demand for greater rudder power entailed by the necessity of providing for the condition of one or two outboard power-units being out of action. The present invention has for its object to provide an improved form of aeroplane, wherein the conventional stabilising and control surfaces and their equivalent can be omitted and a substantial improvement in efficiency is thereby achieved.

The aircraft, according to the invention, although called an aeroplane is not a true aeroplane, because, as will be seen, the wings are not fixed in flight but are movable for purpose of control. The term "aeroplane" hereinafter used therefore, in referring to the invention, is intended in that sense but is not intended to include such movable wing aircraft as cyclogyros, helicopters, ornithopters and the like.

In an aeroplane according to the invention, there is one pair of wings, and the body is so shaped and the wings are so shaped and mounted on the body that when the areoplane is in normal flight, inherent stability of pitch is obtained by balancing with stable equilibrium the natural pitching moment exerted on the body when inclined at small angles of incidence to the airstream against the pitching moment of the lift acting in the opposite sense, and the wings are adjustable relative to the body while in flight to give control of pitch. According to additional features of the invention, the wings can be adjusted to give longitudinal trim or control of roll or yaw.

Inherent stability in pitch is obtained by placing the wings towards the rear end of the body and by so arranging the shape and/or attitude of the body and wings that the rate of change of pitching moment due to the wings with regard to the angle of incidence is greater than the rate of change of pitching moment of opposite sign due to the body with regard to the angle of incidence. Account must, of course, be taken of any natural pitching moment of the wings themselves although preferably this may be made to vanish.

The invention may, accordingly, be stated in another way as being an aeroplane with one pair of wings in which the body is so shaped and the wings so shaped and mounted on the body that when the aeroplane is in normal flight, the natural pitching moment exerted on the body when inclined at small angles of incidence acts in the opposite sense to the pitching moment due to the lift, stability against small disturbances in pitch being maintained by arranging that the pitching moment due to the lift changes with change of angle of incidence more rapidly than does the natural pitching moment on the body and in the opposite sense, and in which the wings may be moved relative to the body while in flight to give control of pitch. The invention is also for an aeroplane with a single pair of wings and without tail-planes, elevators, fins, rudders or ailerons, or the like, stability in pitch being obtained by the shape and relative mounting of the body and the wings, and control being obtained by making the wings adjustable relative to the body while in flight.

Control in pitch can be provided by changing the incidence of both port and starboard wings in unison and in relation to the body, while control in roll can be obtained either by ailerons or by differential adjustment of the incidence of the wings.

Inherent stability in yaw may be obtained by the drag force due to the wings acting behind the centre of gravity of the aeroplane in such manner as to counteract disturbances in the horizontal plane. Control in yaw may be obtained either in the well known manner by banking the aeroplane in such attitude as to execute a turn in the desired direction, or by altering the relative positions of the body and the wings with respect to an axis mutually perpendicular to the longitudinal axis of the body and the spanwise axes of the wings.

When the speed of the aeroplane is substantially less than that of normal flight, e. g. during take-off and landing, the necessity for modifying the wing incidence to such a degree that the aeroplane would assume a pronounced tail-down attitude (with the well-known disadvantages attendant thereon) may be avoided by mounting the wings on the body with capability of relative fore-and-aft movement; thus, by adjusting the wings forwardly the horizontal distance between the areodynamic centre and the centre of gravity may be diminished to an extent sufficient to achieve a balance between the bow-down pitching moment due to the wing and the bow-up pitching moment due to the body. In this manner longitudinal trim can be obtained.

If the body is a solid of revolution, its pitching moment is entirely caused by its attitude to the prevalent airstream, and in stable flight the aeroplane will assume an attitude slightly pitched bow-up. If the shape of the aeroplane body is used to produce a pitching moment, its longitudinal axis wil be slightly cambered so that when flying in the attitude of zero normal force due to the body, a bow-up pitching moment is present. This pitching moment may be increased or diminished by change of attitude.

In flight, control in pitch is provided by changing the incidence of both port and starboard wing-sections in unison (as distinct from the differential adjustment employed to give control in roll), and in relation to the body.

An efficient form of fuselage for an aeroplane constructed in accordance with the invention will be one in which the width in cross-section is greater than its depth. Such a shape will not only produce the large pitching moments required for the purpose of controlling the aircraft in pitch and sufficient yawing moments for giving control in yaw in the worst possible condition of power-units out of action, but will also permit an undercarriage of adequate base to be built into the body instead of attaching it to the wings. In these circumstances, the use of variable-incidence wings becomes practicable, which fact in its turn enables the designer to employ wings of such high lift-coefficient that a reduction in the safe minimum take-off and landing speeds is obtained. Elimination of the conventional aileron enables a wing-section having zero pitching moment about the aerodynamic centre to be used—such as was heretofore well-known practice before the necessity for delicacy of balance of the aileron surfaces rendered this type of wing unsuitable—thus contributing to delicacy of control when the wings are rotated in unison about the spanwise axis to alter their incidence.

The nature of the invention and the manner in which it may be carried into effect may be more clearly understood by reference to the accompanying diagrammatic drawings, of which Fig. 1 is a longitudinal elevation, Fig. 2 a plan, and Fig. 3 an elevation as viewed from the after end, of an aeroplane constructed in accordance with this invention. Figs. 4 and 5 are fragmentary views drawn to a considerably larger scale, respectively in section along the transverse axis of the wings, and in plan respectively, illustrating a convenient method of connecting the port and starboard wings in such manner as to permit their differential adjustment in flight for control in roll, and Fig. 6 is a transverse section, taken on the curved line VI—VI in Fig. 5, illustrating the positions of the parts when the wings are rotated differentially.

Fig. 7 is a chordal section of the wing, illustrating a method of attaching it to the body with capability of adjustment in the manner required by the invention.

From Figs. 1 to 3 it will be seen that the aeroplane illustrated has a fuselage 10, of greater width in cross-section than its depth, which is mounted upon wings 11, 12 at a point near to the stern of the body, there being no tail-planes, elevators, fins, rudders and ailerons.

The positions of the aerodynamic centre and the centre of gravity when the wings occupy the position shown in full lines in Fig. 2, may be assumed to be indicated by the reference numerals 13, 14 respectively.

Figure 1:
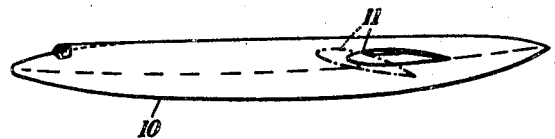
Fig. 1 depicts the positions of the wings in relation to the body during normal flight (in full lines) and when the body is moved rearwardly to compensate for reduction of body pitching moment at low speed (in chain-dotted lines).
Figure 2:
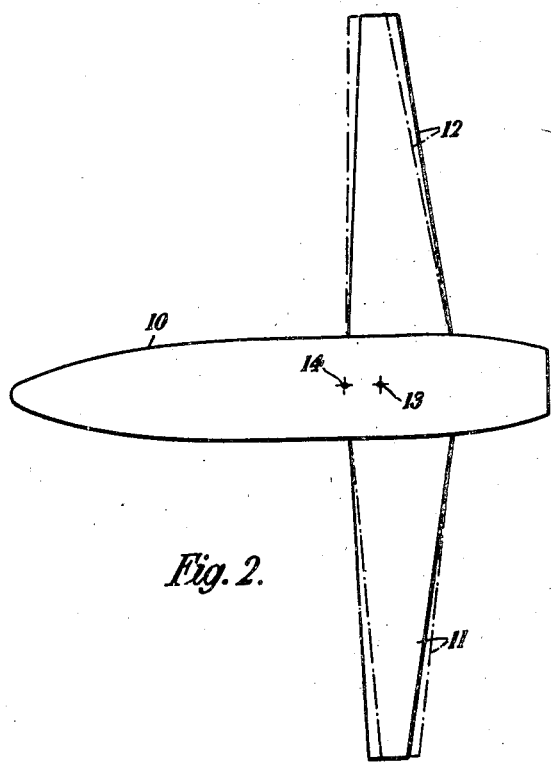
Fig. 2 shows in chain-dotted lines the relative positions of the wings and body when adjusted, e. g. to compensate for the failure of a port wing power-unit.
Figure 3:
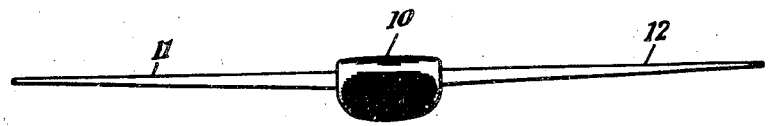
Figure 4:
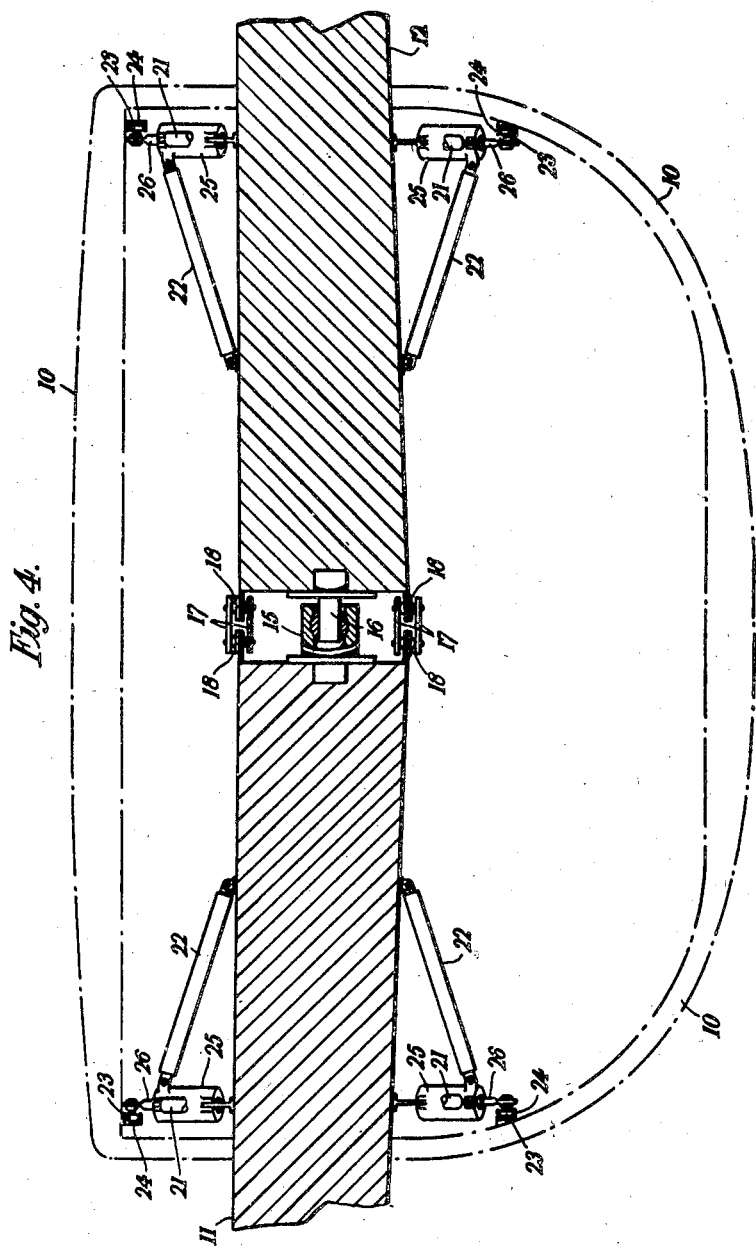
Figure 5:
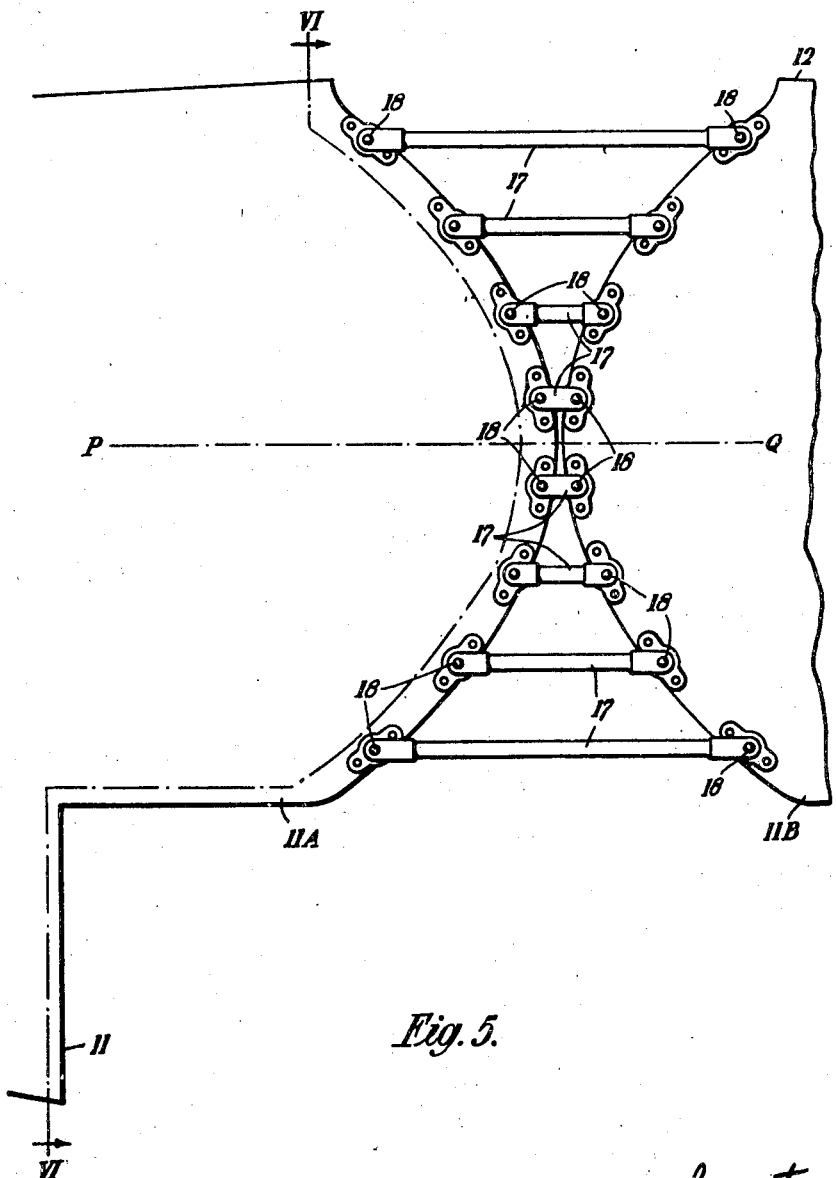

The linkage illustrated in Figs. 4, 5 and 6, connects the adjacent butt-ends of the port and starboard wings 11A and 11B respectively. In this arrangement the wings 11, 12 meet in a universal spigot joint comprising the male and female members 16, 15 respectively mounted on the opposing faces. Links 17 connect the wings as shown, so as to provide the requisite flexural continuity between the latter, being anchored at their extremities in spherical joints 18 located on the inner terminal faces of the respective wings. When relative rotation takes place between the port and starboard wings 11, 12, the links 18 no longer coincide in direction with the local generators of the wing surfaces, but assume the deflected positions shown in Fig. 6, resulting in the effective shortening of the distance between the wing-sections 11, 12. To ensure that differential rotation may take place without strain, the spherical anchorages 18 are located so that they lie on parabolic arcs convex to the plane of symmetry. The spigot joint 15, 16 is of such a character as to permit the slight relative approaching movement along the spanwise axis P—Q (Fig. 5) which occurs during the aforesaid relative pivotal movement.

The body 10 is mounted on the wings 11, 12 in such manner that the relative positions of the body and wing may be adjusted (a) by imparting a rotary movement to the wings as a whole, for variation of incidence, (b) by differential rotary movement of the wings for control in roll, (c) by fore-and-aft movement of the body in relation to the wings for compensating variations in body pitching moment, and (d) by relative rotary movement about an axis mutually perpendicular to the longitudinal axis of the body and the spanwise axis of the wings, for additional control in yaw. The means employed for such body-mounting may comprise a pair of frames respectively attached to the root-portions of the two wings near the sides of the body. Each such frame (comprising the members 20, 21 and 22, shown in Figs. 4 and 7) is supported by rollers 23 running on tracks 24 fixed longitudinally within the body, there being one such track 24 above and one below the wing, and the arrangement is such that each frame constitutes a carriage free to travel along such track under control from the cockpit but precluded from displacement in the vertical direction. Such movements of the frames may be effected in any suitable manner, as for example, through a lead screw (not shown) threaded into a nut (not shown) in the frame of the corresponding roller 23, the rotation of this screw being effected through suitable control linkage or the like operated from the cockpit.

Incorporated in each frame is a duplex hydraulic system comprising a pair of opposed cylinders 25 mounted co-axially respectively above and below the wings and attached by the triangular bracing members 20, 21 and 22 to the upper and lower sides of the respective wing. The cylinders 25 may be of equal bore and each contains a piston fixed on a rod 26 at the extremity of which is mounted one of the aforesaid track-guided rollers 23. The effective area of each piston is the same on both sides, and the interior of one cylinder is connected to the interior of the other by two large-bore pipes 27, 28, one communicating between the upper parts of said cylinders 25 and the other communicating between the lower parts of said cylinders, in such fashion as to constitute two separate fluid systems.

Thus, the weight of the body acting on the wings is supported by the pressure of the fluid in the lower hydraulic system and downward forces transmitted by the wings to the body are resisted by the pressure in the upper system.

The displacement of the centre of pressure of the wings from the mid-point of the hydraulic axis (which may be defined as the line joining the centres of the upper and lower rollers 23) produces a moment which may be used to balance any aerodynamic pitching moment due to flaps or other high-lift devices. This displacement may be effected by pumping fluid from one system to the other.

It is a characteristic property of the frames provided as aforesaid that they will resist motion in the direction of a force acting along the hydraulic axis, but are themselves freely capable of expansion or contraction in the same direction. For example, if a wing be rotated in such a direction that it requires an extension of the length of the frame, as represented by the distance between the track-rollers 23 supporting its extremities, fluid in one system is free to flow through the transfer pipe 27 from the upper side of the upper piston to the upper side of the lower piston, and in the other system through the pipe 28 from the under side of the lower piston to the under side of the upper piston. A rotation of the wing in the opposite direction, requiring a contraction in the length of the frame, is permitted by fluid transfers in the opposite directions. When both wings are rotated simultaneously in the same direction, for the purpose of an adjustment of the incidence of the wings, both frames will turn about the aerodynamic centre of the aerofoil; a differential adjustment in opposite directions, for the purpose of giving control in roll, will be accommodated by corresponding opposite turning movement of the frames.

To adjust the wings about a "vertical" axis, for the purpose of control in yaw, one frame-carriage may be advanced along its horizontal track rails 24 whilst the other frame-carriage is moved rearwardly to a corresponding extent, the wings to which said frames are attached turning as the frames move.

Where it is desired to modify the relative positions of the centre of pressure of the wings and the centre of gravity of the aircraft for longitudinal trimming adjustment, both frame structures can be traversed in a fore-and-aft direction along the horizontal guide-rails 24 within the limits of their length, without affecting the angular positions of the wings.

The natural property of the body, when its longitudinal axis is inclined at a small angle to the airstream, of producing relatively large pitching moment with a negligible increase in drag is only realised when the wings are located towards the rear of the body. If the wings are attached to the body in the forward position, in the conventional manner, or even if small aerofoils are mounted at the extreme nose of the body, as in the "tail-first" aeroplane, this property is seriously interfered with, but if the attachment of any form of protuberance to the fore-body can be avoided, the preservation of an unimpeded airflow over the major portion of the body permits the latter to develop the full value of the pitching moment which is natural to it, so that the body itself can take the place of a conventional stabilizing surface in dynamic flight.

What I claim as my invention and desire to secure by Letters Patent is:

1. In a flying body, the combination of wings and an elongated fuselage extending substantially forwardly of the wings, said fuselage having a positive pitching moment in uniform horizontal flight, the wings being mounted on said fuselage, with their centre of pressure located aft of the centre of gravity of the flying body, said wings having a negative pitching moment due to the forces acting thereon, said pitching moments being balanced one against the other in uniform horizontal flight, and adjustable means mounting the wings on the fuselage for changing the position of the wings thus varying the position of the centre of pressure thereof and hence the value of the wing-pitching moment for effecting control of the flying body in flight.

2. In a flying body, the combination of wings and an elongated fuselage extending substantially forwardly of the wings, said fuselage having a pitching moment in one direction in uniform horizontal flight, the wings being mounted on said fuselage, with their centre of pressure located aft of the centre of gravity of the flying body, said wings having a pitching moment in the opposite direction due to the forces acting thereon, said pitching moments being balanced one against the other in uniform horizontal flight, and adjustable means mounting the wings on the fuselage for changing the position of the wings thus varying the position of the centre of pressure thereof and hence the value of the wing-pitching moment for effecting control of the flying body in flight.

3. In a flying body, the combination of wings and an elongated fuselage extending substantially forwardly of the wings, said fuselage having a positive pitching moment in uniform horizontal flight, the wings being mounted on said fuselage, the centre of pressure of the wings being at all times in uniform horizontal flight disposed rearwardly of the centre of gravity of the flying body, whereby the pitching moment of the fuselage in uniform horizontal flight is balanced by the pitching moment of the wings acting in the opposite sense, and adjustable means mounting the wings on the fuselage providing for varying the distance between the centre of pressure of the wings and the centre of gravity of the aircraft and for varying the angle of the chord of the wings relative to the longitudinal axis of the fuselage for control of the aircraft in flight.

4. A flying body comprising a fuselage having a positive pitching moment in uniform horizontal flight, wings mounted on said fuselage, with the aerodynamic centre of the wings to the rear of the centre of gravity of the flying body and adjustable means mounting the wings on the fuselage for moving said wings relative to the fuselage longitudinally of the aircraft and for rotation of the wings on axes approximately parallel to their spanwise axes whereby control of the aircraft in flight is had by movement of said wings.

5. A flying body comprising wings and a fuselage extending substantially forwardly of the wings, said fuselage having a positive pitching moment in uniform horizontal flight, the wings being mounted on said fuselage with the aerodynamic centre of the wings to the rear of the centre of gravity of the flying body whereby the pitching moment of the fuselage in uniform horizontal flight is substantially balanced by the pitching moment of the wings acting in the opposite sense, and adjustable means mounting the wings on the fuselage providing for the movement of the wings relative to the said fuselage to change the position of the centre of pressure of the wings relative to the centre of gravity of the flying body for effecting pitch control in flight and also providing for variation of the angle of incidence of the wings for effecting control of either pitch or roll of the flying body according to whether the change of incidence of the individual wings is in the same direction or in opposite directions.

6. A flying body, the organs of flight of which consist of a fuselage elongated in the direction of flight and wings mounted thereon, the said fuselage developing during flight a pitching moment about the center of gravity of the flying body and the said wings developing during flight another pitching moment about the said center of gravity, the center of pressure of the wings being spaced from the center of gravity of the flying body in uniform horizontal flight so that in such flight the said pitching moments are balanced, said wings being movable to change the position of the center of pressure thereof with reference to the said center of gravity thereby to control pitch of the body.

7. A flying body, the organs of flight of which consist of a fuselage elongated in the direction of flight and wings mounted thereon, the said fuselage developing during flight a pitching moment about the center of gravity of the flying body and the said wings developing during flight another pitching moment about the said center of gravity, the center of pressure of the wings being spaced from the center of gravity of the flying body in uniform horizontal flight so that in such flight the said pitching moments are balanced, said wings being movable to change the position of the center of pressure thereof with reference to the said center of gravity thereby to control pitch of the body, and said wings being rotatable in phase about an axis approximately parallel to the span-wise axis of the flying body to control pitch of the body and rotatable out of phase about said first axis to control roll thereof.

8. A flying body, the organs of flight of which consist of a fuselage elongated in the direction of flight and wings mounted thereon, the said fuselage developing during flight a pitching moment about the center of gravity of the flying body and the said wings developing during flight another pitching moment about the said center of gravity, the center of pressure of the wings being spaced from the center of gravity of the flying body in uniform horizontal flight so that in such flight the said pitching moments are balanced, said wings being movable to change the position of the center of pressure thereof with reference to the said center of gravity thereby to control pitch of the body, said fuselage having an upwardly concave cambered longitudinal axis.

9. A flying body, the organs of flight of which consist of a fuselage elongated in the direction of flight and wings mounted thereon, the said fuselage extending substantially forwardly of the wings and developing during flight a pitching moment about the center of gravity of the flying body and the said wings developing during flight another pitching moment about the said center of gravity, the center of pressure of the wings being spaced from the center of gravity of the flying body in uniform horizontal flight so that in such flight the said pitching moments are balanced.

10. A flying body as described in claim 9 in which said fuselage is rounded and has a cross-sectional width not less than its depth.

BARNES NEVILLE WALLIS.

REFERENCES CITED

The following references are of record in the file of this patent:

UNITED STATES PATENTS

| Number | Name | Date |
| --- | --- | --- |
| 1,868,417 | Hill | July 19, 1932 |
| 2,293,644 | Gluhareff | Aug. 18, 1942 |